(12) United States Patent
Hedderich et al.

(10) Patent No.: US 7,573,630 B2
(45) Date of Patent: Aug. 11, 2009

(54) PHOTOCHROMATIC EFFECT FOR POLYCARBONATE GLAZING APPLICATIONS

(75) Inventors: Wilfried Hedderich, Hilden (DE); Christophe Lefaux, Ann Arbor, MI (US); Keith D. Weiss, Fenton, MI (US)

(73) Assignee: Exatec, LLC, Wixom, MI (US)

( * ) Notice: Subject to any disclaimer, the term of this patent is extended or adjusted under 35 U.S.C. 154(b) by 252 days.

(21) Appl. No.: 11/445,507

(22) Filed: Jun. 2, 2006

(65) Prior Publication Data

US 2007/0278815 A1    Dec. 6, 2007

(51) Int. Cl.
    *G02F 1/03*    (2006.01)
(52) U.S. Cl. .................. 359/241; 359/601; 65/30.11
(58) Field of Classification Search ......... 359/241–244, 359/601; 65/30.1, 30.11; 396/457
    See application file for complete search history.

(56) References Cited

U.S. PATENT DOCUMENTS

| 4,687,679 | A | | 8/1987 | Beale |
| 5,252,450 | A | | 10/1993 | Schwerzel et al. |
| 6,084,702 | A | * | 7/2000 | Byker et al. ............. 359/288 |
| 6,114,437 | A | | 9/2000 | Brown et al. |
| 6,367,930 | B1 | | 4/2002 | Santelices et al. |
| 2005/0202184 | A1 | | 9/2005 | Iacovangelo et al. |

FOREIGN PATENT DOCUMENTS

| DE | 42 12 831 | 10/1993 |
| WO | WO 96/34735 | 11/1996 |
| WO | WO 00/78520 | 12/2000 |

OTHER PUBLICATIONS

Article Entitled "Polycarbonate Makes More Headway in Vehicle Glazing," British Plastics & Rubber (online), Nov. 2005, p. 26.

* cited by examiner

*Primary Examiner*—Huy K Mai
(74) *Attorney, Agent, or Firm*—Brinks Hofer Gilson & Lione

(57) ABSTRACT

A window assembly having photochromatic properties is described. The window assembly includes a substrate being adjacent to a coating. A photochromatic film is located between the substrate and the coating, whereby the photochromatic film darkens when the window assembly is exposed to ultraviolet light.

16 Claims, 4 Drawing Sheets

PHOTOCHROMATIC EFFECT FOR POLYCARBONATE GLAZING APPLICATIONS

BACKGROUND

1. Field of the Invention

The present invention generally relates to transparent plastic panels for use in automobiles and other structures and more particularly, to window assemblies for the same.

2. Description of the Known Technology

Plastic materials, such as polycarbonate (PC) and polymethyl methyacrylate (PMMA), are currently being used in the manufacturing of numerous automotive parts and components, such as B-pillars, headlamps, and sunroofs. Automotive window modules represent an emerging application for these plastic materials because of various advantages in the areas of styling/design, weight savings, and safety/security. More specifically, plastic materials offer the automotive manufacturer the ability to reduce the complexity of the window assembly through the integration of functional components into the molded plastic module, as well as to distinguish their vehicle from a competitor's vehicle by increasing overall design and shape complexity. The use of light weight plastic window modules may facilitate both a lower center of gravity for the vehicle and improved fuel economy. Additionally, plastic window modules increase the overall safety of a vehicle by enhancing the retention of occupants during a rollover accident.

However, plastic window modules, like their glass counterparts, may allow significant amounts of solar energy into the occupant compartment of the automobile. If a prolonged period of time passes without any form of cooling, the occupant compartment of the automobile may become uncomfortable. Furthermore, even if a cooling system is provided to cool the occupant compartment, use of the cooling system will result in an increased load on the vehicle, possibly lowering the fuel economy of the automobile.

One way of limiting the introduction of solar energy into the passenger compartment of the vehicle is by tinting the window module, thereby only allowing a portion of sunlight through the window module. However, on less sunny days, a tinted window module has the drawback of excessively darkening the occupant compartment of the automobile and may impede the ability of the occupants to clearly see objects through the window module.

Therefore, it is desired to provide a plastic window module capable of limiting solar energy introduced into the occupant compartment of the automobile without impeding the vision of the occupants on less sunny days.

BRIEF SUMMARY

In overcoming the drawbacks and limitations of the known art, the present invention provides a window assembly having photochromatic properties. The window assembly includes a substrate having a top side and a bottom side, a first coating over the substrate, and a photochromatic film located between the top side of the substrate and the first coating. The photochromatic film includes a polycarbonate (PC) film and a photochromatic layer attached to the PC film. The photochromatic layer is located between the PC film and the substrate, thereby encapsulating the photochromatic layer between the PC film and the substrate. The first coating layer may include a weathering layer and a plasma layer. The weathering layer may be made of a material that includes the basic chemistry of acrylic, polyurethane, siloxane, or a combination thereof. Additionally, a second coating, made of the same material of the first coating, may be applied to the bottom side of the substrate. The plasma layer is a "glass-like" coating deposited on the weathering layer In another embodiment, a functional layer may be located between the top side of the substrate and the photochromatic film. The functional layer may incorporate a specific function into the window assembly. Moreover, functional layer may have multiple layers to accomplish these functions.

Further objects, features and advantages of this invention will become readily apparent to persons skilled in the art after a review of the following description, with reference to the drawings and claims that are appended to and form a part of this specification.

DETAILED DESCRIPTION

Figure 1:
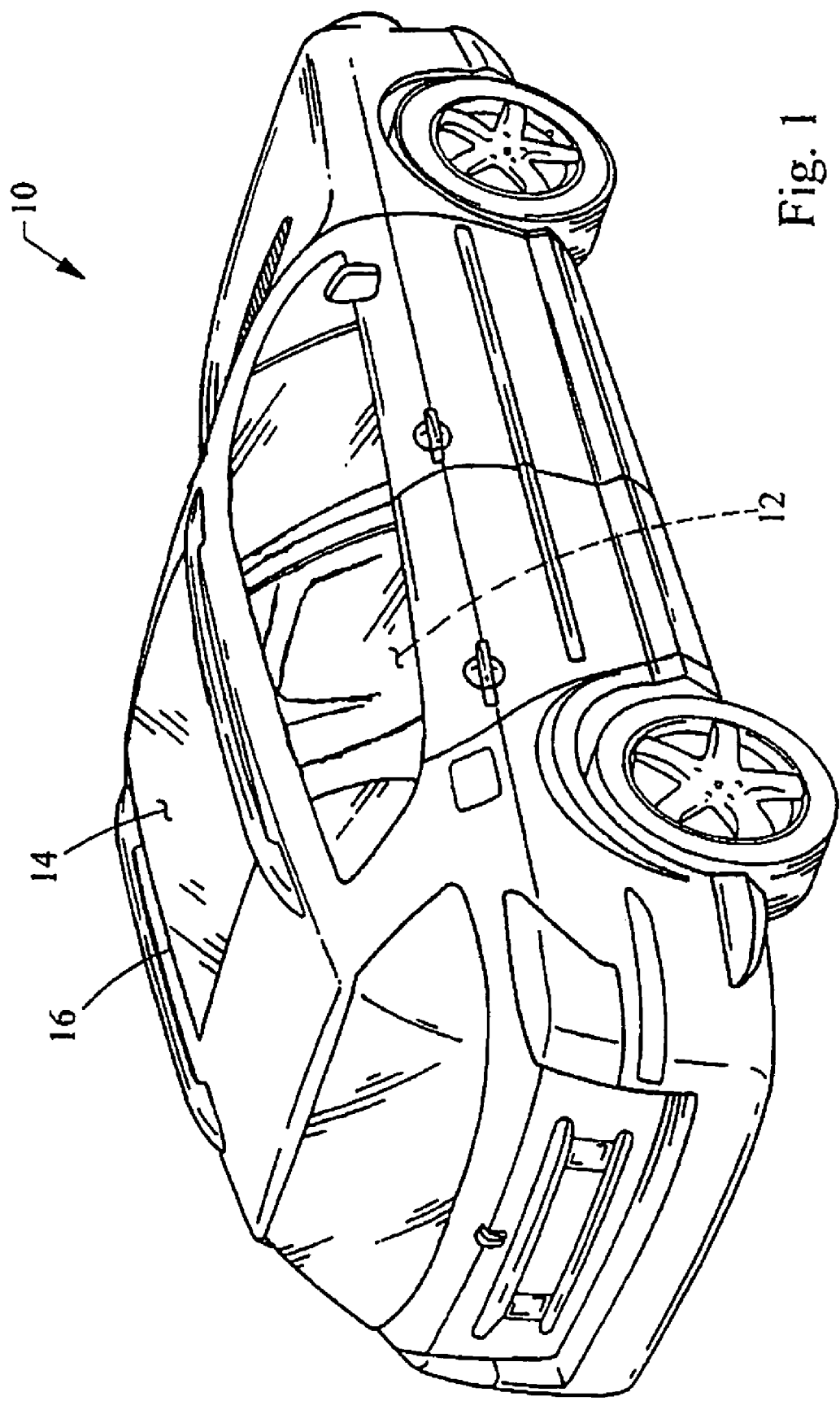
FIG. 1 is a perspective view of an automobile having a window assembly embodying the principles of the present invention having photochromatic properties.

Referring to FIG. 1, an automobile 10 incorporating the present invention is shown therein. The automobile 10 includes an occupant compartment 12 located within the interior of the automobile 10 and a window assembly. 14 mounted via a frame 16 to the automobile 10 as a sun roof or moon roof.

Although this description describes using the window assembly 14 as a sun roof or moon roof, the invention is equally applicable to other areas of the automobile 10. For example, the window assembly 14 may be appropriately located and dimensioned to be used as a driver side window, a passenger side window, rear windows, a front windshield and/or any other windows the automobile 10 may have.

Figure 2:
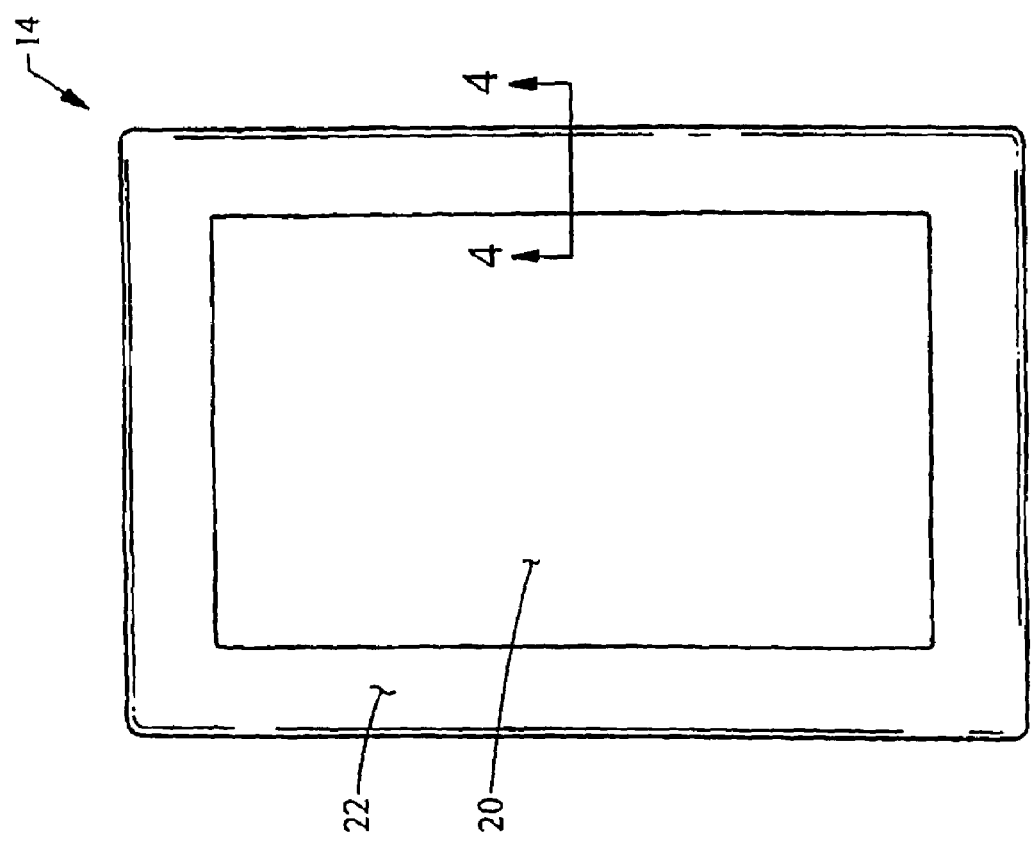
FIG. 2 is a top view of a window assembly embodying the principles of the present invention.

Referring to FIG. 2, a more detailed view of the window assembly 14 is shown. As shown therein, the window assembly 14 has a transparent viewing area 20 and a photochromatic area 22. In the alternative, the photochromatic area 22 may cover the entire window assembly 14. The transparent viewing area 20 is similar to a conventional window assembly in that the transparent area 20 allows light to pass through and enter the occupant compartment 12. The photochromatic area 22 is similar to the transparent area 20; however, the photochromatic area is transparent in the absence of UV light and darkens when exposed to UV light, as in direct sunlight, preventing the transmission of UV light into the occupant compartment 12.

Figure 3:
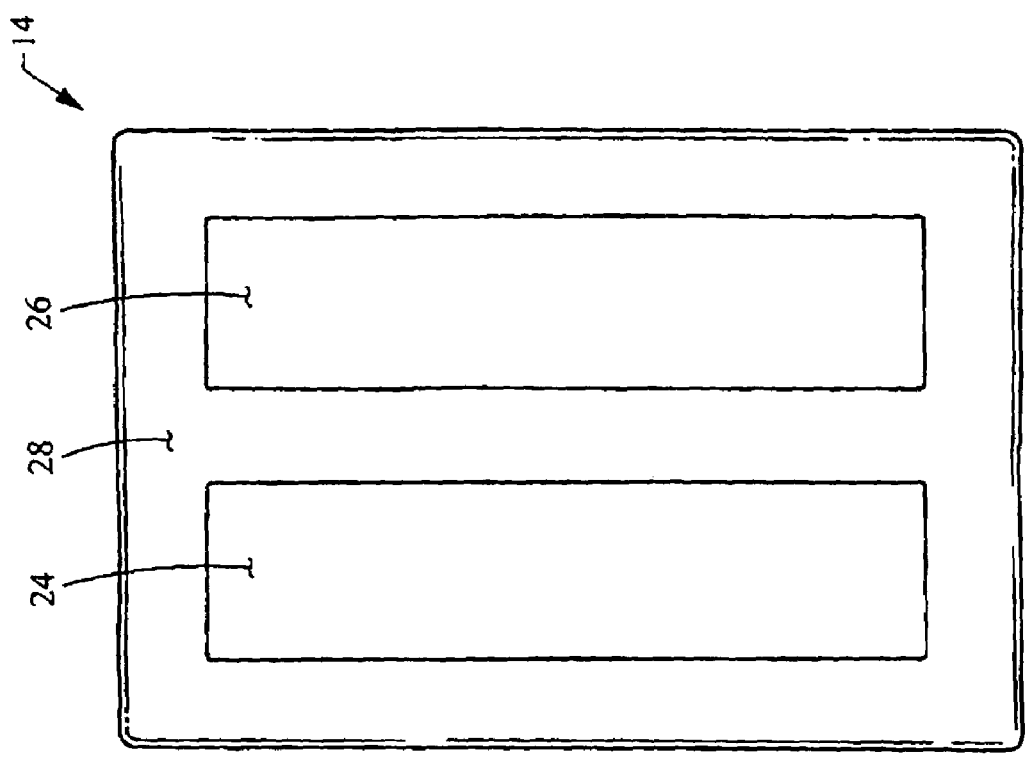
FIG. 3 is a top view of another embodiment of the window assembly embodying the principles of the present invention.

Another embodiment of the window assembly 14 is shown in FIG. 3. In this layout, the window assembly 14 has two transparent areas 24, 26 surrounded and separated by a photochromatic area 28. Similar to the previous embodiment, the transparent area 24 is similar to a conventional window assembly while the photochromatic area 28 prevents the transmission of light to the occupant compartment 12. Obviously, the photochromatic area 28 may be laid out as desired in any number of patterns. For example, the photochromatic area 28 may cover the entire window assembly 14.

Figure 4A:
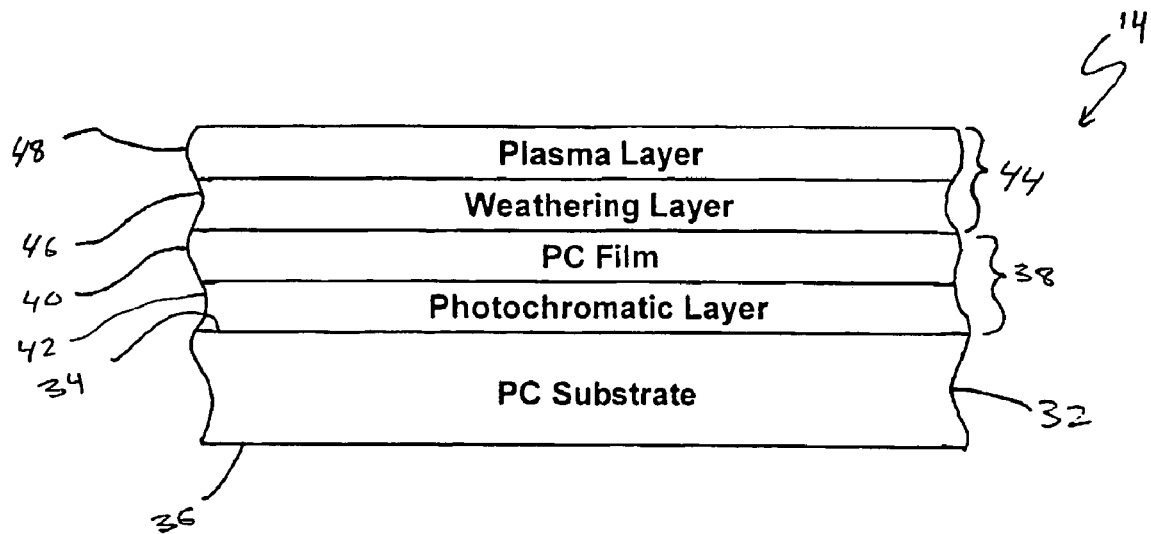
FIG. 4A is a cross sectional view of a portion of the window assembly generally taken along lines 4-4 in FIG. 2.

Referring to FIG. 4A, a cross section, generally taken along lines 4-4 in FIG. 2 is shown therein. The window assembly 14 includes a substrate 32 having a top side 34 and a bottom side 36. The substrate 32 is preferably transparent and may be made of polycarbonate (PC), polymethyl methacrylate (PMMA), polyester blends, glass and glass fibers and any combination thereof. Preferably, the substrate 32 is transparent.

Above the top side 34 of the substrate 32 is a photochromatic film 38. The photochromatic film 38 is clear in the absence of UV light and darkens when exposed to UV light, as in direct sunlight, limiting the transmission of UV light into the occupant compartment 12, as best shown in FIG. 1. The photochromatic film 38 may be applied to the substrate 32 by a film insert molding (FIM) process or a lamination process.

The photochromatic film 38 includes a PC film layer 40 coupled to a photochromatic layer 42, thereby encapsulating the photochromatic layer 42 between the PC film layer 40 and the topside 34 of the substrate 30. The PC film layer 40 may be made of PC, PMMA or any combination thereof. The photochromatic layer 42 may be made of a metal halide or an organic material. The metal halide may be silver chloride (AgCl) or silver bromide (AgBr) or combinations thereof. The organic material may be a photochromatic dye, stereoisomers and polynuclear aromatic hydrocarbons or combinations thereof. Photochromism in organic materials is associated with heterolytic and hemolytitc cleavage, cis-trans isomerisation and tautomerism.

Located above the photochromatic layer 38 is a coating 44. The coating 44 includes a weathering layer 46 and a plasma layer 48. The weathering layer 52 is a material that includes the basic chemistry of acrylic, polyurethane, siloxane, or a combination of these materials to provide high weatherablity and long term ultraviolet. Further, the weathering layer 52 may also include a material having ionomer chemistry or similar material. Moreover, in another embodiment of the present invention, silicon/nanoparticles may be blended into the material of the weathering layer 52 or a silioxyane copolymer is formed into the weathering layer 52 by polymerization. The plasma layer 54 is a "glass-like" coating deposited on the weathering layer 52 by plasma enhanced chemical vapor deposition (PECVD) process or the like. The plasma layer 54, in an embodiment of the present invention, is a multilayer plasma coating and may be silicone coating applied by one of a flow, a dip and a spray method.

Figure 4B:
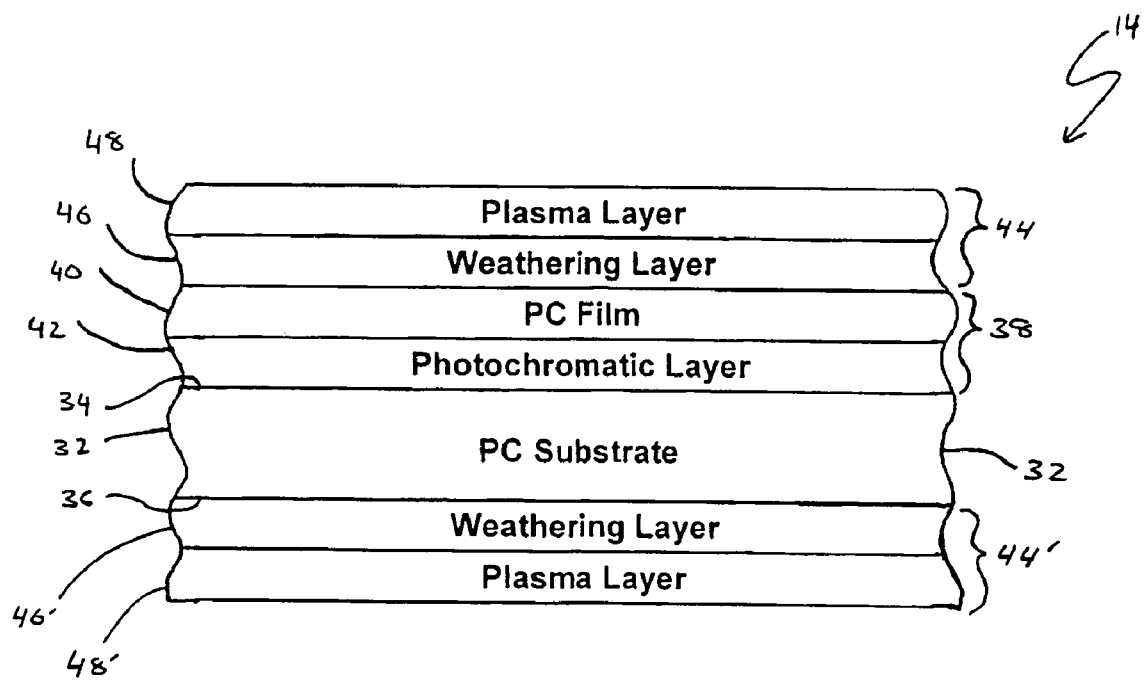
FIG. 4B is a cross sectional view similar to FIG. 4A of the window assembly having a coating layer on both sides of the window assembly.

Referring to FIG. 4B, an alternative embodiment of the window assembly 14 is shown. This embodiment is similar to the embodiment shown in FIG. 4A. However, this embodiment differs in that this embodiment has a second coating layer 50' having a weathering layer 52' and a plasma layer 54' coupled to the bottom side 36 of the substrate 32.

Figure 4C:
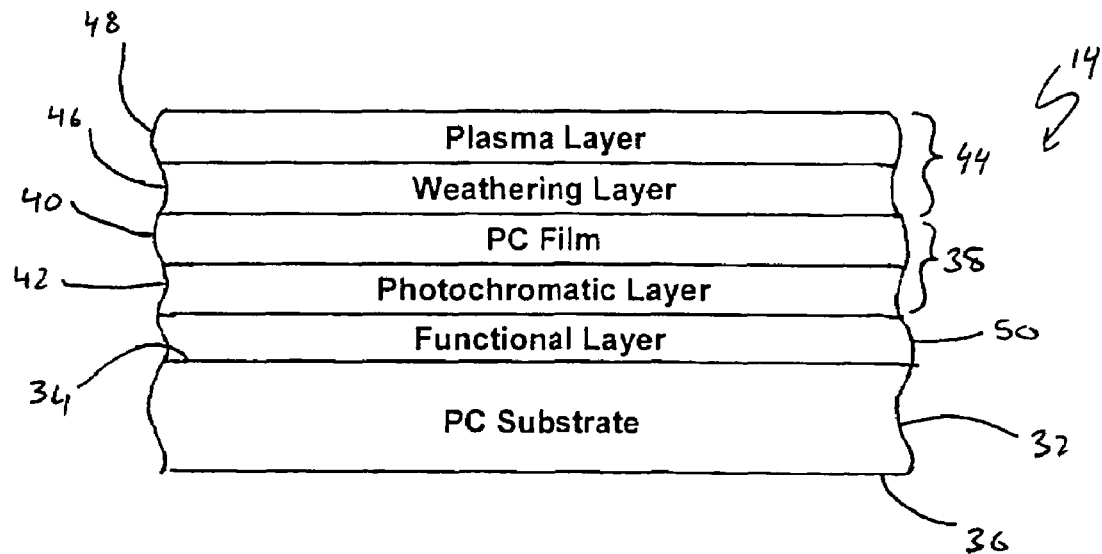
FIG. 4C is a cross sectional view similar to FIG. 4A of the window assembly incorporating a functional layer.

Referring to FIG. 4C, an alternative embodiment of the window assembly 14 is shown. This embodiment is similar to the embodiment shown in FIG. 4A. The difference being that this embodiment has a functional layer 50 located between the photochromatic film 38 and the top side 34 of the substrate 32. The functional layer 50 is a layer that may incorporate a specific function into the window assembly 14. For example, the functional layer 50 may be a black out ink layer (for making portions of the window assembly 14 opaque), electroluminescent layer, light emissive layer or a defrosting layer. Moreover, functional layer 50 may have multiple layers to accomplish these functions and others.

Figure 4D:
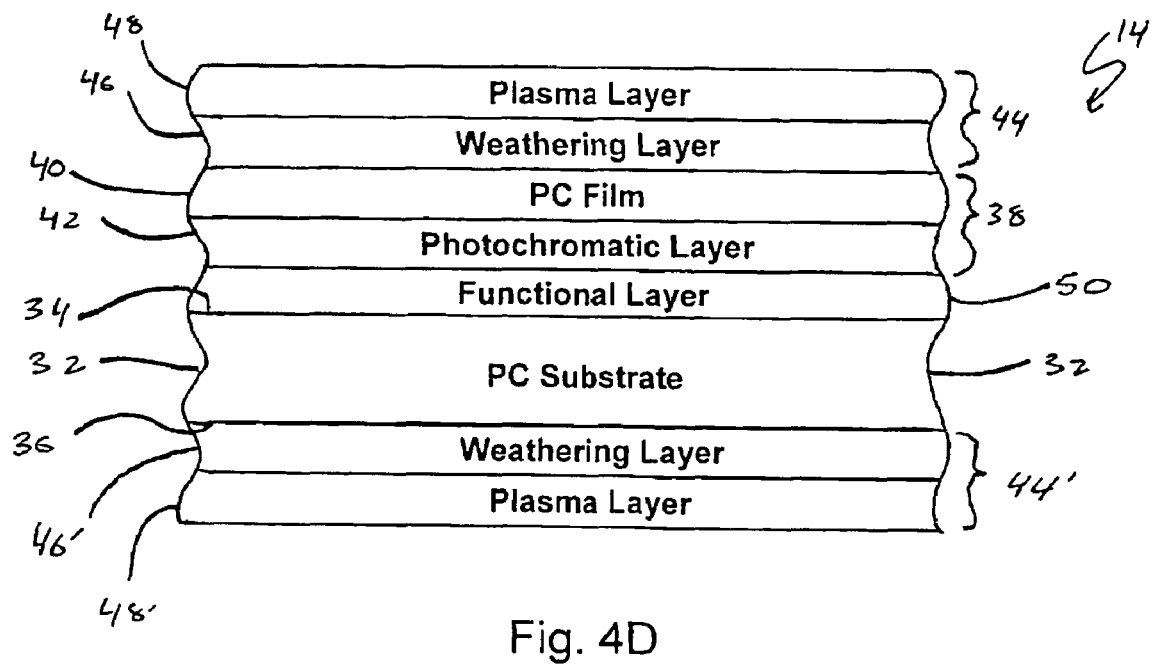
FIG. 4D is a cross sectional view similar to FIG. 4C of the window assembly having a coating layer on both sides of the window assembly.

Referring to FIG. 4D, an alternative embodiment of the window assembly 14 is shown. This embodiment is similar to the embodiment shown in FIG. 4C. The difference being that this embodiment has a second coating layer 50' having a weathering layer 52' and a plasma layer 54' coupled to the bottom side 36 of the substrate 32.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

The invention claimed is:

1. A window assembly having photochromatic properties, the window assembly comprising:
   a substrate having a first side and a second side;
   a first coating located adjacent to the first side of the substrate;
   a photochromatic film located between the first side of the substrate and the first coating, the photochromatic film further comprising a plastic film and a photochromatic layer on the plastic film.

2. The window assembly of claim 1, wherein the substrate is made from a material selected from the group including polycarbonate, polymethyl methacrylate, polyester blends, glass fibers and combinations thereof.

3. The window assembly of claim 1, wherein the substrate is transparent.

4. The window assembly of claim 1, wherein the photochromatic layer located between the first side of the substrate and the polycarbonate film.

5. The window assembly of claim 4, wherein the polycarbonate film is made from polycarbonate, polymethyl methacrylate and combinations thereof.

6. The window assembly of claim 4, wherein the photochromatic layer is made from a metal halide material, a photochromatic organic material and combinations thereof.

7. The window assembly of claim 6, wherein the metal halide material is made from silver chloride, silver bromide and combinations thereof.

8. The window assembly of claim 6, wherein the photochromatic organic material is made from a photochromatic dye, stereoisomers, polynuclear aromatic hydrocarbons and combinations thereof.

9. The window assembly of claim 1, wherein the first coating further comprises a weathering layer and a plasma layer, the weathering layer being located between the photochromatic film and the plasma layer.

10. The window assembly of claim 9, wherein the weathering layer is made from at least one of acrylic, polyurethane, siloxane, and combinations thereof.

11. The window assembly of claim 9, wherein the plasma layer is attached to the weathering layer.

12. The window assembly of claim 1, further comprising a functional layer located between the photochromatic film and the first side of the substrate.

13. The window assembly of claim 12, wherein the functional layer is at least one of a defrosting layer, electroluminescent layer and a black out ink layer.

14. The window assembly of claim 1, further comprising a second coating applied over to the second side of the substrate.

15. The window assembly of claim 14, wherein the second coating further comprises a weathering layer and a plasma layer, the weathering layer being located between the second side of the substrate and the plasma layer.

16. The window assembly of claim 15, wherein the weathering layer is made from at least one of acrylic, polyurethane, siloxane, and combinations thereof.

* * * * *